United States Patent [19]

Jahnke et al.

[11] 4,220,623

[45] Sep. 2, 1980

[54] FLUIDIZED CATALYTIC CRACKING REACTOR

[75] Inventors: Frederick C. Jahnke, Houston; John P. MacLean, Stafford; Dale Williams, Houston; John D. Brown, The Woodlands, all of Tex.

[73] Assignee: Texaco Inc., White Plains, N.Y.

[21] Appl. No.: 891,414

[22] Filed: Mar. 29, 1978

[51] Int. Cl.² .................. B01J 8/26; C10G 13/18; C10G 35/14

[52] U.S. Cl. .................. 422/144; 208/151; 208/164; 422/147

[58] Field of Search ............ 422/139, 144, 145, 147; 208/153, 161, 163, 164, 151

[56] References Cited

U.S. PATENT DOCUMENTS

| | | | |
|---|---|---|---|
| 2,698,224 | 12/1954 | Brooke | 422/147 X |
| 2,958,653 | 11/1960 | Kruse, Jr. | 422/144 X |
| 3,083,082 | 3/1963 | Kleiber | 422/147 |
| 3,188,185 | 6/1965 | Slyngstod et al. | 422/144 |
| 3,248,319 | 4/1966 | Bowles et al. | 208/164 X |
| 3,261,776 | 7/1966 | Baumann et al. | 422/144 X |
| 3,355,380 | 11/1967 | Luckenbach | 422/144 X |
| 3,841,843 | 10/1974 | Williams et al. | 422/144 X |
| 3,898,050 | 8/1975 | Strother | 422/144 |

*Primary Examiner*—Joseph Scovronek
*Attorney, Agent, or Firm*—Carl G. Ries; Thomas H. Whaley; Douglas H. May, Jr.

[57] ABSTRACT

A fluidized catalytic cracking unit wherein cyclone diplegs extend from the reactor vessel into the stripping vessel, for reducing the overall height of the unit. Valve means are provided at the lower end of the diplegs to prevent blow by of gas through the diplegs. The diplegs pass through the vent lines.

4 Claims, 1 Drawing Figure

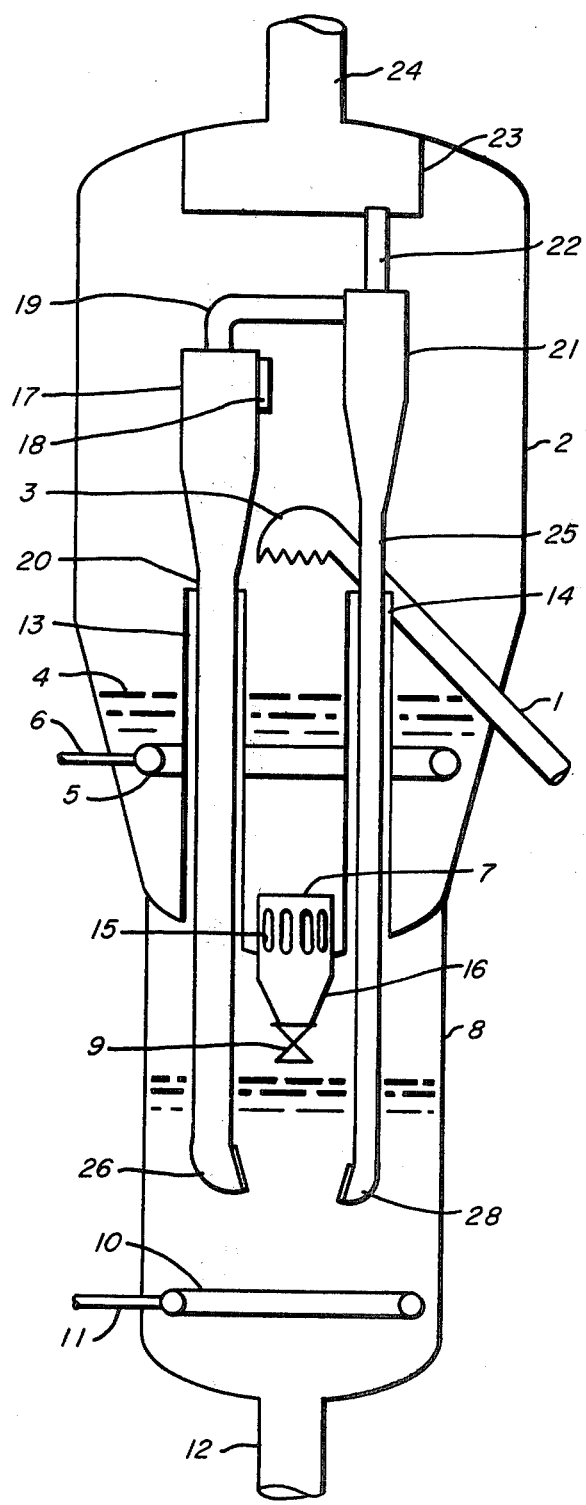

4,220,623

FLUIDIZED CATALYTIC CRACKING REACTOR

BACKGROUND OF THE INVENTION

1. Field of the Invention

The present invention relates to Fluidized Catalytic Cracking. More particularly, it relates to an improved Fluidized Catalytic Cracking Reactor Vessel. In particular, it relates to a Fluidized Catalytic Cracking reactor vessel wherein diplegs from cyclones, for separating catalyst from hydrocarbon vapors, extend into a stripping vessel located below the reactor vessel.

In Fluidized Catalytic Cracking of hydrocarbons, one common arrangement of the Fluidized Catalytic Cracking Unit comprises an upwardly directed transport reactor riser conduit discharging into a vertical reactor vessel. Cyclone separation means are arranged in the upper portion of the reactor vessel with catalyst diplegs extending into the lower portion of the reactor vessel. A slide valve, or other valve means, in the bottom of the reactor vessel provides communication between the reactor vessel bottom and a stripper vessel vertically disposed below the reactor vessel. Vent pipes provide communication for stripping vapor to flow from the top of the stripper vessel into the upper portion of the reactor vessel.

In operation, a mixture of hot catalyst and hydrocarbon vapors flow upwardly through the transport reactor riser under cracking conditions at a velocity such that the catalyst is transported, along with the hydrocarbon vapors, into the reactor vessel. The catalyst and hydrocarbon vapors discharge from the upper end of the transport reactor riser into the reactor vessel, forming a dense phase bed of catalyst surmounted by a dilute phase of catalyst suspended in hydrocarbon vapors. The dense phase catalyst bed is generally maintained in a fluidized condition by injection of primary stripping gas, such as steam, into the lower portion of the fluidized bed.

From the dilute phase, catalyst and hydrocarbon vapors flow into cyclone separators, generally comprising two or three stages, wherein hydrocarbon vapors are separated from the catalyst. The hydrocarbon vapors flow from the outlet of the last stage of cyclone separators into a plenum located in the top of the reactor vessel. From the plenum, the hydrocarbon vapors, free of catalyst, flow through an overhead line to a fractionation tower.

Catalyst, separated from hydrocarbon vapors in the cyclone separators, flow downward from the cyclone separators through diplegs, and is discharged below the level of the fluidized dense phase catalyst bed. Although the bottom dipleg outlets are equipped with dipleg trickle valves to control the flow of catalyst therefrom, it is desirable to maintain the level of the fluidized dense phase catalyst bed at least several feet above the dipleg outlets, for ensuring hydraulic seals.

Catalyst, in the fluidized dense phase bed, flows downwardly through the slide valve in the reactor bottom into the upper portion of a stripper vessel. In the stripper vessel, the catalyst is contacted with stripping vapor, generally steam, injected into the lower portion of the stripper vessel, for vaporizing any volatile hydrocarbons which may be occluded within the catalyst. Stripping vapors and volatized hydrocarbons flow from the top of the stripper vessel through stripper vent lines into the dilute phase contained in the upper portion of the reactor vessel. The stripper vent lines extend well above the upper surface of the fluidized dense phase catalyst bed.

Stripped catalyst flows via a spent catalyst line, from the bottom of the stripper vessel into a regeneration zone.

In such Fluidized Catalytic Cracking Processes, the reactor vessel must have substantial height to accommodate the cyclone separators, their diplegs, the plenum and the depth of fluidized dense phase bed of catalyst. A substantial portion of this reactor vessel height is required to provide adequate length for the cyclone diplegs, which length is required to allow accumulation of catalyst in the diplegs and thus prevent under-flow of hydrocarbon vapors from the cyclone separators back to the lower portion of the reactor vessel. Extension of the diplegs into the dense phase catalyst bed provides a hydraulic seal which ensures that a level of catalyst is maintained in the dipleg.

In the processes for cracking hydrocarbons with more active modern catalysts, such as ion exchanged alumino-silicate molecular sieves, it has been found advantageous to contact the hydrocarbons with hot catalyst under dilute phase conditions for a relatively short time in a transport reactor riser and avoid contact of hydrocarbon vapors with spent catalyst in the fluidized dense phase catalyst bed. Yields and octane of naphtha produced are increased. In such processes, the only dense bed of catalyst required in the reactor vessel is one sufficient to seal the reactor slide valve inlet such that hydrocarbon vapors cannot flow from the reactor vessel into the stripper and such that stripping vapors cannot flow through the slide valve into the bottom of the reactor vessel.

Substantially all the reactor vessel height must be maintained, however, to accommodate the required dipleg lengths, and the required depth of fluidized dense phase catalyst bed to hydraulically seal the diplegs.

SUMMARY OF THE INVENTION

Now according to the method of the present invention we have discovered an improved configuration for the apparatus in a Fluidized Catalytic Cracking reaction zone and stripping zone which substantially reduces the required regenerator vessel height.

The advantages of this improved configuration includes a reduction in reactor vessel height as well as associated structural members and piping. Such reduction in height results in substantial reduction in cost of a Fluidized Catalytic Cracking Unit. Additionally, the depth of dense phase catalyst bed in the reactor vessel may be reduced to the minimum required to properly seal the reactor vessel slide valve, thus substantially eliminating overcracking hydrocarbons in the dense phase bed, in the situation where the modern cracking catalysts are employed.

BRIEF DESCRIPTION OF THE DRAWING

The drawing is a schematic representation of a Fluidized Catalytic Cracking reaction zone and stripping zone embodying the improvements of the present invention.

DETAILED DESCRIPTION OF THE INVENTION

In order to better describe the improvement of the present invention, attention is now drawn to the drawing. The drawing is a schematic representation of the reaction and stripping zones of a Fluidized Catalytic Cracking Unit which embodies the improvements of the present invention. The drawing is in only such detail as required to clearly demonstrate the present invention, and many elements commonly found in Fluidized Catalytic Cracking Units, such as piping, pumps, instrumentation, etc., but which are unnecessary for a complete description of the present invention, have been omitted for the sake of clarity. The drawing is of one embodiment of the present invention only, and is not intended as a limitation upon the invention which is set-out in the appended claims.

In the drawing, a riser transport reactor 1 extends upwardly through the side wall of a reactor vessel 2, and riser 1 terminates in a downwardly directed discharge head 3. Hot, regenerated catalyst and vaporized hydrocarbon charge flow upward in riser 1 at cracking conditions including a hydrocarbon vapor velocity in the range of about 20 to 60 ft/sec., sufficient to transport the catalyst along with the flowing hydrocarbon vapor. The catalyst and hydrocarbon vapor exit riser 1 via discharge head 3 into reactor vessel 2 wherein the catalyst and hydrocarbon vapors separate forming a dense phase catalyst bed, having an upper surface 4, in the lower portion of reactor vessel 2 and a dilute phase of catalyst suspended in hydrocarbon vapor in the upper portion of reactor vessel 2. In the middle area or reactor vessel 2, extending from about 7 to 10 feet above discharge head 3 to the dense phase bed upper surface 4, the catalyst and hydrocarbon vapors form a transition zone wherein catalyst and hydrocarbon vapors are undergoing the separation process. The exact height of the transition zone varies with the superficial vapor velocity of vapors flowing upward in reactor vessel 2, wherein increased superficial vapor velocities, commonly in the range of 1 to 6 ft/sec, result in increased height of the transition zone.

In the drawing, a steam ring 5, supplied with steam from a steam header 6 is located in the lower portion of reactor vessel 2. Steam from header 6 and ring 5 flows into the lower portion of reactor vessel 2, thereby maintaining the dense phase bed of catalyst as a fluidized bed, and stripping a portion of any vaporizable occluded hydrocarbons from the catalyst. Preferably, with modern Fluidized Cracking Catalysts, the height of the fluidized dense phase catalyst bed is maintained at the minimum required for stable flow of spent catalyst from the bottom of reactor vessel 2, as is herein below described.

In the drawing, catalyst collector 7 comprising an open cylinder having a slotted upper wall 15 and a solid lower wall 16 extends through the bottom of reactor vessel 1 into a vertical cylindrical stripper vessel 8. The solid lower wall 16 of catalyst collector 7 is of a height, in the range of about 2 to 4 feet, sufficient to provide a static head of catalyst which will overcome the pressure differential between stripper vessel 8 and reactor vessel 2, as will be herein below described. Stripper vessel 8 is vertically disposed beneath reactor vessel 2 and communicates at the bottom with a spent catalyst transfer line 12. A slide valve 9 provides communication from the bottom of catalyst collector 7 and the upper portion of stripper vessel 8. Stripper vent lines 13 and 14 provides communication between the top of stripping vessel 8 and the dilute catalyst phase maintained in the upper portion of reactor vessel 2. A stripper steam ring 10, supplied from a steam header 11, is located in the lower portion of stripper vessel 8. Spent, coke contaminated cracking catalyst, containing some occluded vaporizable hydrocarbons, flows downwardly from the fluidized dense phase catalyst bed in reactor vessel 2, through catalyst collector 7 and slide valve 9 into the upper portion of stripping vessel 8. Slide valve 9 is adjusted to control the flow of spent catalyst from reactor vessel 2 to essentially the same rate as catalyst enters reactor vessel 2 via riser 1, such that the upper lever 4, of the fluidized dense phase catalyst bed is maintained at a desired elevation. In stripper vessel 8, steam from steam ring 10 contacts spent catalyst, vaporizing hydrocarbon therefrom. Stripped, coke contaminated catalyst exits the bottom of stripper vessel 8 via spent catalyst transfer line 12 to a regeneration zone, not shown. Stripping steam and hydrocarbon vapor exit the top of stripper vent lines 13 and 14 and flow into the dilute catalyst phase maintained in the upper portion of reactor vessel 2. Two stripper vent lines 13 and 14 are shown in the drawing. This number of vent lines is, however, not limiting and the actual number of vent lines will equal the number of cyclone diplegs, as described herein below. The free cross-sectional area of stripper vent lines 13 and 14 is calculated, considering their height and the flow rate of stripping steam into stripper vessel 8, to provide about 1 to 4 psi pressure drop such that stripping vessel 8 will operate at a higher pressure than the upper portion of reactor vessel 2. The height of the lower portion 16 of catalyst accumulator 7, as hereinabove described is selected such that the static head of catalyst therein will overcome the pressure differential between stripping vessel 8 and reactor vessel 2, such that spent catalyst will flow from the bottom of reactor vessel 2 into the top of stripping vessel 8.

In the Drawing, a primary cyclone separator 17, having a primary cyclone inlet 18, in communication with a primary cyclone vapor conduit 19 and a primary cyclone catalyst dipleg 20, is located in the upper portion of reactor vessel 2 at an elevation such that primary cyclone inlet 18 will be within the dilute catalyst phase above the transition zone heretofore described. Primary cyclone vapor conduit 19 communicates between the upper portion of primary cyclone separator 17 and the inlet of a secondary cyclone separator 21. From the upper portion of secondary cyclone separator 21, a secondary cyclone vapor outlet 22 communicates with a plenum 23 located in the top of reactor vessel 2. A hydrocarbon vapor line 24 communicates with plenum 24 through the top of reactor vessel 2. The bottom of secondary cyclone 21 is in communication with the upper end of a secondary cyclone catalyst dipleg 25.

Dilute phase, comprising catalyst suspended in hydrocarbon vapor, and having a density in the range of about 0.1-3 pounds per cubic foot, enters primary cyclone separator 17 via inlet 18, wherein catalyst is separated from hydrocarbon vapor. Separated catalyst flows downward from primary cyclone 17 into primary cyclone dipleg 20 and hydrocarbon vapor, containing a small amount of catalyst flows upward into primary cyclone vapor conduit 19. Hydrocarbon vapor from primary cyclone vapor conduit 19 flows into secondary cyclone separator 21, wherein substantially all remaining catalyst is separated from hydrocarbon vapor. Separated catalyst flows downward from secondary cyclone 21 into secondary cyclone catalyst dipleg 25. Hydrocarbon vapor flows upward from secondary cyclone 21 through secondary cyclone vapor outlet 22 into plenum 23. From plenum 23, hydrocarbon vapor exits reactor vessel 2 via vapor line 24, and flows to a primary fractionation column, not shown.

In the drawing, only one primary cyclone 17 and one secondary cyclone 21 have been shown. It is to be understood however that additional cyclone separators, in series and in parallel arrangement, may be employed according to the present invention as required for obtaining the substantially complete separation of catalyst from hydrocarbon vapor. Commonly, in Fluidized Catalytic Cracking Units, two stages of cyclone separators in series are employed. However, it is known to use three stages in series. Whether a single cyclone or a plurality of cyclones in parallel are used at a particular stage of separation, will depend upon engineering design considerations including available space, weight, etc.

Primary cyclone catalyst dipleg 20 extends downward from the bottom of primary cyclone 17 through stripper vent line 13 into stripping vessel 8, wherein dipleg 20 terminates in a flapper valve 26. Secondary cyclone catalyst dipleg 25 extends downward from the bottom of secondary cyclone 21, through stripper vent line 14 into stripping vessel 8, wherein dipleg 25 terminates in a flapper valve 28. For process units wherein more than two cyclones are employed, each cyclone catalyst dipleg extends downward through a stripper vent line into stripper vessel 8. Catalyst from primary cyclone 17 and secondary cyclone 21 flows through primary cyclone catalyst diplegs 20 and 25 into stripping vessel 8. Catalyst flow is controlled by flapper valves 26 and 28. The differential pressure between stripping vessel 8 and the upper portion of reactor vessel 2, preferably in the range of 1 to 8 psi, provides a back pressure sufficient to maintain a column of catalyst in diplegs 20 and 25, thus preventing blow-by of hydrocarbon vapor down diplegs 20 and 25. Flapper valves 26 and 28 are typical of dipleg flapper valves commonly employed in Fluidized Catalytic Cracking units and operate such that they close, preventing ingress of vapor into the diplegs, until the weight of the column of catalyst accumulated in the diplegs is sufficient to open the flappers. If desired, in accord with the present invention, a dense phase bed of catalyst may be maintained in stripping vessel 8 with upper surface above dipleg flapper valves 26 and 28 for providing additional hydraulic seal for diplegs 20 and 25.

Thus, in accordance with the improvement of the present invention, the cyclone diplegs 20 and 25 are extended into stripper vessel 8. By so doing, reactor vessel 2 may be shortened substantially. That is, the portion of the height of reactor vessel 2 previously required to accommodate discharge of diplegs 20 and 25 and to accommodate the additional depth of fluidized bed required to provide a hydraulic seal for diplegs 20 and 25 is no longer required and may be dispensed with. This height savings is in the range of 10 feet or more for a commercial scale Fluidized Catalytic Cracking Unit, and represents a very substantial reduction in cost of building such a unit. The Reactor vessel 2 may be shortened 10 feet or more, as well as supporting structural steel and associated piping. Considering the size of such units, this savings is substantial.

In the Drawing, diplegs 20 and 25 pass through stripper vent lines 13 and 14, forming annular openings. Stripping vapors flow upward from stripping vessel 8 into the upper portion of reactor vessel 2 through these annular openings. As heretofore stated, the sizes of stripper vent lines 13 and 14 are based upon the cross sectional area of the annular openings formed between the inside of vent lines 13 and 14 and the outside walls of diplegs 20 and 25.

As hereinabove described, improved apparatus for Fluidized Catalytic Cracking of hydrocarbons is disclosed wherein cyclone diplegs are extended from a vertical, cylindrical reactor vessel into a stripping vessel vertically disposed below said reactor vessel. Such extension of the diplegs allows reduction of the heights of dense phase bed required to be maintained in reactor vessel 2. Consequently, the heights of reactor vessel 2 may be shortened by a commensurate amount. This reduction in reactor vessel 2 height, and also the height of related piping and structural steel provides a substantial savings in cost of building such a unit. Additionally, reduction in the dense phase bed maintained in reactor vessel 2 avoids overcracking of hydrocarbons which results in increased yield and octane of naphtha product.

It will be understood that the above description is illustrative of a preferred embodiment of the present invention. Additional modifications within the spirit and scope of the present invention, will occur to those skilled in the art, and such additional modifications may fairly be presumed to be within the scope of the invention as defined in the claims below.

We claim:

1. In a Fluidized Catalytic Cracking Unit the combination comprising:
   (a) a vertical, cylindrical reactor vessel for maintaining a dilute phase of catalyst suspended in hydrocarbon vapor above a fluidized dense phase bed of spent catalyst;
   (b) an upwardly directed riser transport reactor communicating internally with said reactor vessel for discharging hydrocarbon vapor and spent catalyst into said reactor vessel;
   (c) cyclone separator means in the upper portion of said reactor vessel for separating said dilute phase into hydrocarbon vapors and spent catalyst;
   (d) hydrocarbon vapor outlet means in communication with said cyclone separator means for transferring separated hydrocarbon vapors from said cyclone separator means to processing facilities outside said reactor vessel;
   (e) a cylindrical stripping vessel vertical disposed below said reactor vessel;
   (f) spend catalyst collector means communicating with the interior of said reactor vessel through the bottom thereof for providing a static head of catalyst which will exceed the pressure differential between said reactor vessel and said stripping vessel;
   (g) spent catalyst transfer means in communication with the lower interior portion of said spent catalyst collector means and with the interior of said stripping vessel for transferring catalyst from the bottom of said reactor vessel into the upper portion of said stripping vessel;
   (h) stripper vent lines communicating between the top of said stripping vessel and the upper portion of said reactor vessel for allowing flow of stripping vapors from the upper portion of said stripping vessel to the dilute phase region of said reactor vessel;
   (i) cyclone separator catalyst diplegs extending from the bottom of said cyclone separator means within said reactor vessel through said stripper vent lines into said stripping vessel for providing a path of flow for separated catalyst from said cyclone separator means into said stripping vessel; and (j) means for maintaining a column of catalyst in said diplegs to prevent blow-by of either hydrocarbon vapors from said cylcone separator means or stripping vapors from said stripping vessel through said diplegs.

2. The apparatus of claim 1 wherein the number of said vent lines is equal to the number of said diplegs, and wherein said diplegs extend from said reactor vessel into said stripping vessel through said stripping vapor vent lines, forming annular spaces between the inside walls of said vent lines and the outside walls of said diplegs.

3. The apparatus of claim 2 wherein said annular spaces are of a cross sectional area sufficient to provide a pressure drop for stripping vapors flowing therethrough such that said stripping vessel is maintained at a higher pressure than the upper portion of said reactor vessel.

4. The apparatus of claim 3 wherein said means for maintaining a column of catalyst in said diplegs comprises catalyst flapper valves at the lower discharge end of said diplegs.

* * * * *